(12) United States Patent
Patel et al.

(10) Patent No.: US 10,562,709 B2
(45) Date of Patent: Feb. 18, 2020

(54) CONVEYOR BELT FOR USE WITHIN A TOASTER APPLIANCE FOR PREVENTING THE PINCHING OF FOOD BUNS

(71) Applicants: Jignesh Patel, Bartlett, IL (US); Chad Elliott, Frankfort, IL (US); Joe Carone, Darien, IL (US)

(72) Inventors: Jignesh Patel, Bartlett, IL (US); Chad Elliott, Frankfort, IL (US); Joe Carone, Darien, IL (US)

(73) Assignee: A. J. Antunes & Co., Carol Stream, IL (US)

( * ) Notice: Subject to any disclaimer, the term of this patent is extended or adjusted under 35 U.S.C. 154(b) by 0 days.

(21) Appl. No.: 16/118,139

(22) Filed: Aug. 30, 2018

(65) Prior Publication Data

US 2019/0077605 A1 Mar. 14, 2019

Related U.S. Application Data

(60) Provisional application No. 62/555,740, filed on Sep. 8, 2017.

(51) Int. Cl.
| | |
|---|---|
| *B65G 17/06* | (2006.01) |
| *A47J 37/08* | (2006.01) |
| *A47J 37/04* | (2006.01) |
| *E06B 9/15* | (2006.01) |
| *E06B 9/386* | (2006.01) |

(52) U.S. Cl.
CPC .......... *B65G 17/063* (2013.01); *A47J 37/045* (2013.01); *A47J 37/0857* (2013.01); *A47J 37/0864* (2013.01); *B65G 17/065* (2013.01); *B65G 2201/0202* (2013.01); *B65G 2201/0205* (2013.01); *E06B 9/386* (2013.01); *E06B 2009/1505* (2013.01); *E06B 2009/1544* (2013.01)

(58) Field of Classification Search
CPC ................ B65G 17/063; B65G 17/065; B65G 2201/0202; B65G 2201/0205; A47J 37/045; A47J 37/0864; A47J 37/0857; E06B 9/386; E06B 2009/1505; E06B 2009/1544
USPC ........................................................ 198/850
See application file for complete search history.

(56) References Cited

U.S. PATENT DOCUMENTS

| | | |
|---|---|---|
| 861,484 A | 7/1907 | Stewart |
| 2,767,824 A | 10/1956 | King |
| 3,096,875 A | 7/1963 | Olson |
| 3,509,987 A | 5/1970 | Flaith et al. |
| 4,155,444 A | 5/1979 | Kovats |
| 4,526,271 A | 7/1985 | Finnighan |

(Continued)

*Primary Examiner* — Gene O Crawford
*Assistant Examiner* — Lester Ill Rushin
(74) *Attorney, Agent, or Firm* — Law Offices of Steven W. Weinrieb

(57) ABSTRACT

A conveyor belt for conveying articles along a conveyor path comprises a plurality of slat members disposed parallel to each other and disposed transversely with respect to the conveyor path, wherein leading and trailing edge portions of the slat members are angled downwardly with respect to the conveying surface upon which articles being conveyed are supported so as to prevent edge portions of the articles being conveyed from being interposed between the leading and trailing edge portions of the slat members so as not to be pinched by adjacent ones of the leading and trailing edge portions of adjacent slat members.

17 Claims, 2 Drawing Sheets

(56) References Cited

U.S. PATENT DOCUMENTS

| | | | | |
|---|---|---|---|---|
| 4,764,107 | A * | 8/1988 | Sundermann | C04B 20/06 |
| | | | | 432/101 |
| 4,856,645 | A * | 8/1989 | Hallstrom, Jr. | B65G 25/065 |
| | | | | 198/750.4 |
| 5,358,095 | A | 10/1994 | Curl | |
| 7,987,972 | B2 | 8/2011 | Hennigar et al. | |
| 8,006,828 | B2 * | 8/2011 | Stout | B65G 25/065 |
| | | | | 198/750.2 |
| 9,278,812 | B2 * | 3/2016 | Feigner | B65G 25/065 |
| 10,308,433 | B2 * | 6/2019 | Adomaitis | B65G 17/067 |
| 10,315,847 | B2 * | 6/2019 | Malkowski | B65G 17/42 |
| 2006/0054462 | A1 | 3/2006 | Hillo | |
| 2019/0217336 | A1 * | 7/2019 | Bullard | B05D 3/002 |

* cited by examiner

CONVEYOR BELT FOR USE WITHIN A TOASTER APPLIANCE FOR PREVENTING THE PINCHING OF FOOD BUNS

CROSS-REFERENCE TO RELATED PATENT APPLICATIONS

This patent application is a non-provisional patent application based upon provisional patent application No. 62/555,740 which was filed in the United States Patent and Trademark Office on Sep. 8, 2017, the priority benefits of which are hereby claimed.

FIELD OF THE INVENTION

The present invention relates generally to food equipment, and more particularly to an endless conveyor for conveying food buns within a food appliance in such a manner that pinching and deforming of the food buns is effectively prevented as the food buns are traveling along the endless conveyor, especially within the vicinity of either one of the end portions of the endless conveyor where the conveyor belt is routed around the end drive and driven sprockets of the endless conveyor mechanism.

BACKGROUND OF THE INVENTION

In the fast-food, sandwich-making industry, innumerable food buns are utilized to make various different sandwiches such as, for example, hamburgers. The food buns are usually lightly toasted so as to impart warmth to the food funs as well as to impart a predetermined degree of crispness to the food buns. In addition, particularly within the fast-food industry, speed is a critical factor to be considered when preparing food items as ordered by patrons, as well as the aesthetic appearance of the finished food product. Accordingly, many operations are automated. One such operation is the toasting of the food buns wherein, for example, fresh, non-toasted food buns are inserted into an upper entrance end portion of a toaster appliance, the food buns are then conveyed vertically downwardly through the toaster appliance so as to be toasted while being conveyed vertically downwardly through the toaster appliance, and the toasted food buns are then discharged from a lower end portion of the toaster appliance. The food buns are conveyed along an endless conveyor belt which is continuously rotated around upper and lower drive and driven sprocket mechanisms operatively connected to a suitable drive motor. Alternatively, of course, the appliance can be structured so that the conveyor mechanism can be oriented horizontally.

One example of such an endless conveyor belt is disclosed within U.S. Pat. No. 7,987,972 which issued to Hennigar et al. on Aug. 2, 2011. This patent discloses a wire plate conveyor belt wherein adjacent plate elements are connected together by means of rod structures. Occasionally, particularly at the entrance end portion of the toaster appliance, as the conveyor belt is driven around the curved end portion of the conveyor mechanism, at which one of the drive or driven sprockets is disposed, the adjacent edge portions of adjacent plate elements of the conveyor will tend to separate from each other as the conveyor belt approaches and moves around this curved end portion of the conveyor mechanism. Accordingly, enlarged spaces will effectively be formed between adjacent edge portions of adjacent plate elements whereby an edge portion of a food bun, which has been inserted into the toaster appliance, can become disposed. Subsequently, as the conveyor belt effectively traverses the curved end portion of the endless conveyor, as defined by means of the drive or driven sprocket, the enlarged spaces between the adjacent plate elements will effectively be closed whereby the adjacent edge portions of the adjacent plate elements will again effectively come into engagement with each other. Accordingly, it can be appreciated that if an edge portion of one of the food buns was initially disposed within one of the enlarged spaces, then it would be pinched, distorted, or deformed due to its disposition between the adjacent edge portions of the adjacent plate elements which are now in engagement with each other. This is undesirable from the viewpoint of providing the patron with a food product that is aesthetically pleasing.

A need therefore exists in the art for a new and improved piece of food service equipment. Another need exists in the art for a new and improved food appliance. An additional need exists in the art for a new and improved food appliance comprising a toaster for toasting food products. A still additional need exists in the art for a new and improved food appliance comprising a toaster for toasting food products and which will have a vertically or horizontally oriented conveyor mechanism disposed interiorly thereof for conveying the food products during a toasting cycle. A yet additional need exists in the art for a new and improved food appliance comprising a toaster which has a vertically or horizontally oriented conveyor mechanism disposed interiorly thereof for conveying the food products during a toasting cycle and which is utilized for toasting various different food products such as, for example, food buns. A still yet additional need exists in the art for a new and improved food appliance comprising a toaster which has a vertically or horizontally oriented conveyor mechanism disposed interiorly thereof for conveying the food products during a toasting cycle and wherein the conveyor mechanism comprises an endless conveyor. A further need exists in the art for a new and improved food appliance comprising a toaster which has a vertically or horizontally oriented conveyor mechanism disposed interiorly thereof for conveying food products during a toasting cycle and wherein the conveyor mechanism comprises an endless conveyor which can continuously convey the food products, such as, for example, food buns, from an entrance end portion of the appliance to a discharge end portion of the appliance. A still further need exists in the art for a new and improved food appliance comprising a toaster appliance which has a vertically or horizontally oriented conveyor mechanism disposed interiorly thereof for conveying the food products during a toasting cycle, wherein the conveyor mechanism comprises an endless conveyor which can continuously convey the food products, such as, for example, food buns, from an entrance end portion of the appliance to a discharge end portion of the appliance, and wherein the component parts of the vertically or horizontally oriented endless conveyor will not pinch, distort, or deform the food products while the food products are being conveyed through the toaster appliance.

Overall Objectives of the Invention

An overall objective of the present invention is to provide a new and improved piece of food service equipment. Another overall objective of the present invention is to provide a new and improved food appliance. An additional overall objective of the present invention is to provide a new and improved food appliance comprising a toaster for toasting food products. A still additional overall objective of the present invention is to provide a new and improved food appliance comprising a toaster for toasting food products and which will have a vertically or horizontally oriented conveyor mechanism disposed interiorly thereof for conveying the food products during a toasting cycle. A yet additional overall objective of the present invention is to provide a new and improved food appliance comprising a toaster which has a vertically or horizontally oriented conveyor mechanism disposed interiorly thereof for conveying the food products during a toasting cycle and which is utilized for toasting various different food products such as, for example, food buns. A still yet additional overall objective of the present invention is to provide a new and improved food appliance comprising a toaster which has a vertically or horizontally oriented conveyor mechanism disposed interiorly thereof for conveying the food products during a toasting cycle and wherein the conveyor mechanism comprises an endless conveyor. A further overall objective of the present invention is to provide a new and improved food appliance comprising a toaster which has a vertically or horizontally oriented conveyor mechanism disposed interiorly thereof for conveying food products during a toasting cycle and wherein the conveyor mechanism comprises an endless conveyor which can continuously convey the food products, such as, for example, food buns, from an entrance end portion of the appliance to a discharge end portion of the appliance. A still further overall objective of the present invention is to provide a new and improved food appliance comprising a toaster appliance which has a vertically or horizontally oriented conveyor mechanism disposed interiorly thereof for conveying the food products during a toasting cycle, wherein the conveyor mechanism comprises an endless conveyor which can continuously convey the food products, such as, for example, food buns, from an entrance end portion of the appliance to a discharge end portion of the appliance, and wherein the component parts of the vertically or horizontally oriented endless conveyor will not pinch, distort, or deform the food products while the food products are being conveyed through the toaster appliance.

SUMMARY OF THE INVENTION

The foregoing and other objectives of the present invention are achieved in accordance with the principles and teachings of the present invention through the provision of a new and improved piece of food service equipment or food appliance for toasting food products, such as, for example, food buns, wherein an endless conveyor is disposed internally within the toaster-type food service equipment or food appliance, and wherein the endless conveyor can be oriented either vertically or horizontally. The endless conveyor comprises a plurality of longitudinal slat members which are disposed transversely with respect to the direction of movement of the endless conveyor when the endless conveyor is moving in its direction of movement so as to convey the food products through the toaster appliance, and in order to prevent the food products from becoming pinched, distorted, or deformed, as a result of being interposed between adjacent longitudinal edge portions of adjacent slat members, particularly when the longitudinal slat members traverse the opposite curved end portions of the endless conveyor mechanism at which drive and driven sprocket members are located for moving the endless conveyor mechanism along its endless conveyor path, the longitudinal leading and trailing edge portions of each slat member are angled downwardly at a predetermined angle from, or with respect to, the main planar surface of the endless conveyor upon which the food products are being conveyed. In this manner, adjacent longitudinal leading and trailing edge portions of adjacent longitudinal slat members are angled away from the main planar surface of the endless conveyor upon which the food products are being conveyed such that the food products are always supported upon the main planar surface of the endless conveyor and cannot become interposed between adjacent edge portions of adjacent slat members of the endless conveyor. Accordingly, the food products will not be pinched, distorted, or deformed as a result of being interposed between adjacent edge portions of adjacent slat members of the endless conveyor.

In order to effectively connect the plurality of slat members together so as to collectively form the endless conveyor, as well as to drive the endless conveyor formed by the plurality of slat members, the slat members are respectively fixedly secured, such as, for example, by means of a crimping process or a welding process, to a plurality of longitudinal rods, which are disposed parallel to each other and also extend transversely with respect to the direction of movement of the conveyor, such that the plurality of longitudinal slats are effectively centered upon the longitudinal rods. The end portions of each rod extend longitudinally beyond the end portions of their respective slat members whereby each opposite end portion of each longitudinal rod is then bent so as to form a 90° knuckle bend whereby a second section of the rod extends perpendicular to the first section of the rod, which is the end portion of the longitudinal rod, and thereby extends substantially parallel to the direction of movement of the endless conveyor. Lastly, a third section of the rod comprises a 180° knuckle bend such that the third section of the rod is effectively disposed within the same plane as that of the second section of the rod and is likewise disposed substantially parallel to the direction of movement of the endless conveyor. In addition, the third section of each rod also partially surrounds the first section of an adjacent rod fixedly connected to an adjacent one of the longitudinal slats. In this manner, all of the longitudinal slats are fixedly secured to their respective rods, and all of the rods are connected together as a result of each rod being respectively connected to an adjacent one of the plurality of rods.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
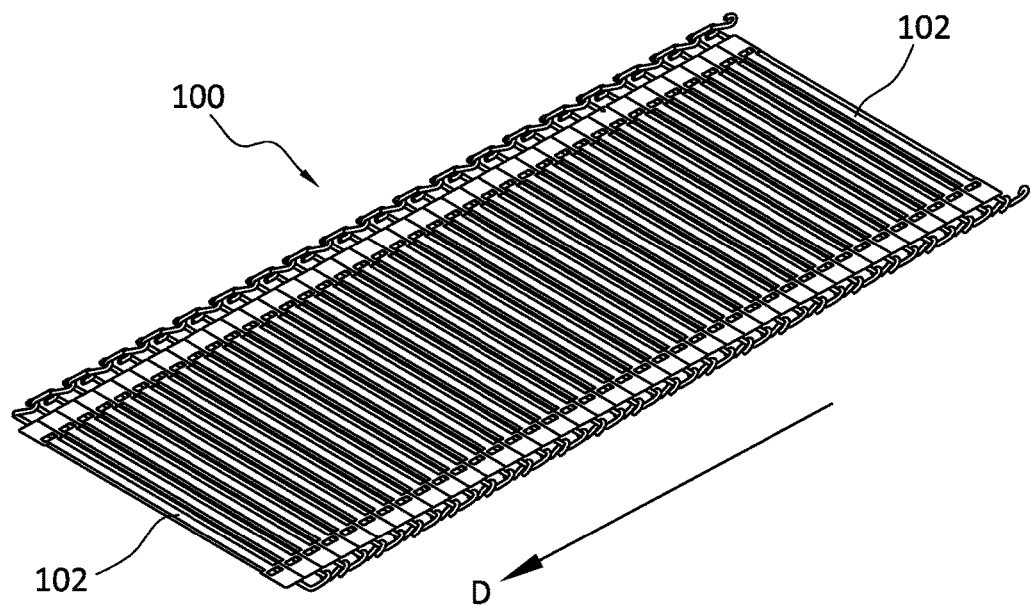
FIG. 1 is a perspective view of the new and improved conveyor belt as constructed in accordance with the principles and teachings of the present invention.
Figure 2:
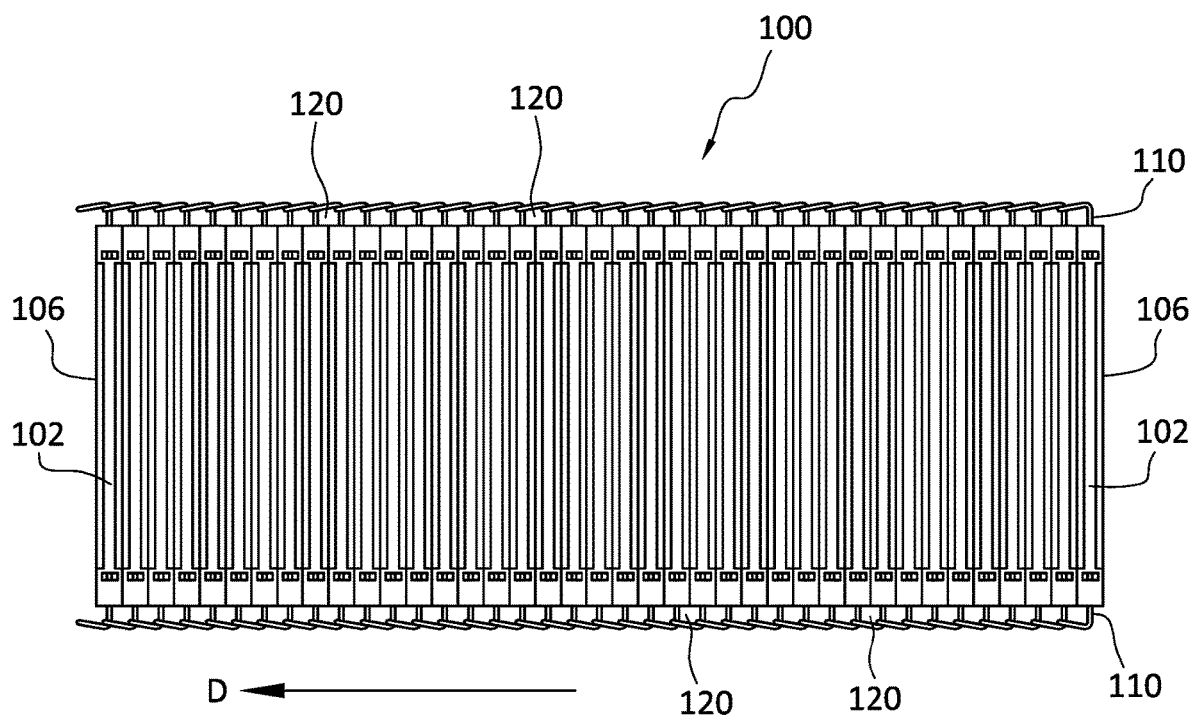
FIG. 2 is a top plan view of the new and improved conveyor belt of the present invention as disclosed within FIG. 1.
Figure 3:
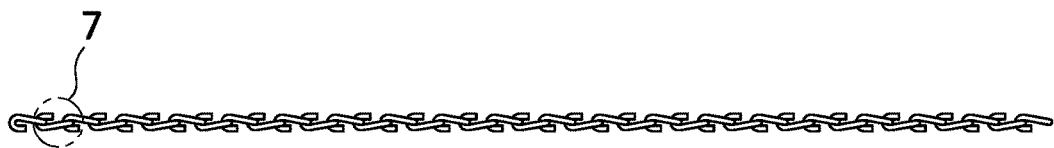
FIG. 3 is a side elevational view of the new and improved conveyor belt as disclosed within FIGS. 1 and 2.

Referring now to the drawings, and more particularly to FIGS. 1 and 2 thereof, the new and improved conveyor belt, for use within, for example, a food product toaster appliance and as constructed in accordance with the principles and teachings of the present invention, is disclosed and is generally indicated by the reference character 100. More particularly, it is seen that the conveyor belt 100 comprises a plurality of longitudinal slat members 102 which are disposed parallel to each other as well as transversely with respect to the direction of movement D of the endless conveyor 100 when the endless conveyor 100 is moving in the direction of movement D so as to convey the food products through the toaster appliance. It is to be appreciated that each one of the plurality of longitudinal slat members 102 is respectively adapted to be fixedly secured to or mounted upon a longitudinal rod 104, which can best be seen in FIG. 6, as a result of a crimping or welding operation. Each one of the plurality of slat members 102 is also provided with a substantially semi-circular cutout or punched out portion 105 at each longitudinal end of each slat member 102 so as to positionally accommodate the opposite ends of the longitudinal rods 104, as can best be seen in FIGS. 6 and 7, such that the slat members 102 can be stably mounted or supported upon the rod members 104 prior to the crimping or welding process.

Figure 7:
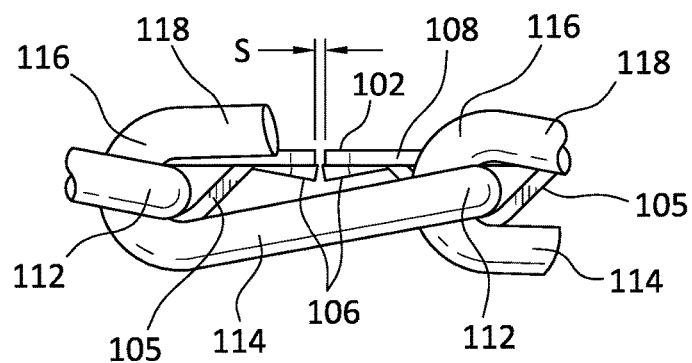
FIG. 7 is an enlarged view of the encircled region denoted by the reference number 7 of FIG. 3 showing one of the rods, to which one of the slats of the endless conveyor as shown in FIGS. 1 and 2 has been fixedly secured, as secured to, or interconnected, with adjacent rods of adjacent slats of the endless conveyor disposed upon opposite sides of the fully disclosed rod.

Continuing further, it is also to be understood, as can best be appreciated from FIG. 7, that when the conveyor belt 100 travels along a substantially planar portion of its endless conveyor path, edge portions of adjacent slat members 102 are spaced very close to each other, as denoted by the letter S in FIG. 7, however, as the conveyor belt 100 approaches and traverses the rounded or curved end portions of the conveyor belt travel path, at which are conventionally located the motor drive and driven sprockets of the conveyor belt mechanism, the spaces defined between the edge portions of the adjacent slat members 102 will be enlarged. Accordingly, such enlarged spaces present the possibility of an edge portion of a food product, such as, for example, a food bun, which has been deposited onto the conveyor belt 100 at a location near or adjacent to one of the rounded or curved end portions of the conveyor belt travel path, to become disposed within one of the enlarged spaces. Subsequently, as the conveyor belt completes its travel traversal around the rounded or curved end portion of the conveyor belt mechanism, the slat members 102 will once again come together such that the edge portions of the adjacent slat members 102 will again be spaced apart from each other by means of the relatively small aforenoted separation distance or space S. Accordingly, if an edge portion of the food product or bun was in fact disposed within the aforenoted enlarged space, the edge portion of the food product or bun will now be pinched, distorted, deformed, or crushed as a result of the same now being interposed between the edge portions of the pair of adjacent slat members 102 which are now very close together.

Therefore, in order to prevent the food products from becoming pinched, distorted, deformed, or crushed, as a result of being interposed between adjacent longitudinal edge portions of adjacent slat members 102, particularly when the longitudinal slat members traverse the opposite curved end portions of the endless conveyor mechanism at which drive and driven sprocket members are located for moving the endless conveyor mechanism along its endless conveyor path, the longitudinal leading and trailing edge portions 106 of each slat member 102 are angled downwardly at a predetermined angle α from, or with respect to, the main planar surface 108 of each one of the plurality of slat members 102 which effectively form the main or primary conveying surface of the endless conveyor 100 upon which the food products are being conveyed, as can best be appreciated from FIG. 7. In this manner, adjacent longitudinal edge portions 106, of adjacent longitudinal slat members 102, are angled away from the main or primary planar surface 108 of each one of the plurality of slat members 102 forming the endless conveyor 100 and upon which the food products are being conveyed such that the food products are always supported upon the main planar surface 108 of each one of the plurality of slat members 102 forming the endless conveyor 100 and cannot become interposed between adjacent edge portions 106 of adjacent slat members 102 of the endless conveyor 100. Accordingly, the food products will not be pinched, distorted, deformed, or crushed as a result of being interposed between adjacent edge portions 106 of adjacent slat members 102 of the endless conveyor 100. It is further noted that the predetermined angle at which the edge portions 106 of the plurality of slats are angled with respect to the main or primary planar portions 108 of the plurality of slat members is preferably 10°. Still yet further, it is noted that the slat members 102 are fabricated from T304 stainless steel and the slat members 102 are subjected to a No. 2B brushed finish using a 20 grit belt with each slat member 102 being passed through the finishing process twice. This fabrication technique imparts desirable qualities to the plurality of slat members 102 such that the food products will effectively adhere to the slat members 102 such that the slat members 102 can properly convey the food products along the conveyor path.

Figure 4:
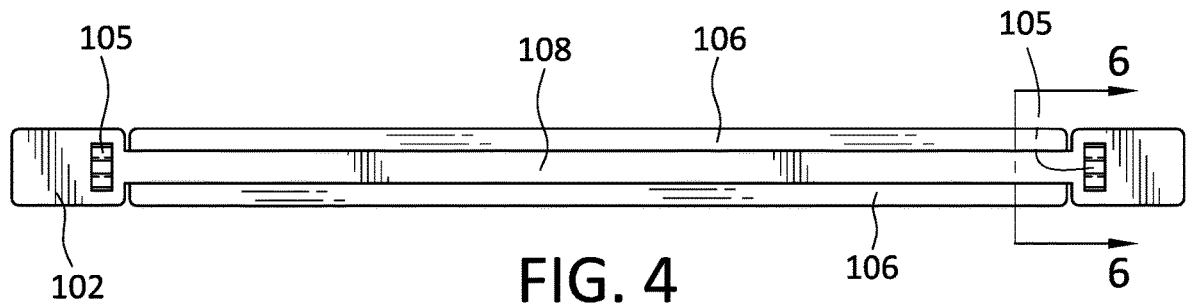
FIG. 4 is a top plan view of one of the plurality of slats which form the endless conveyor belt as shown within FIGS. 1 and 2.
Figure 5:
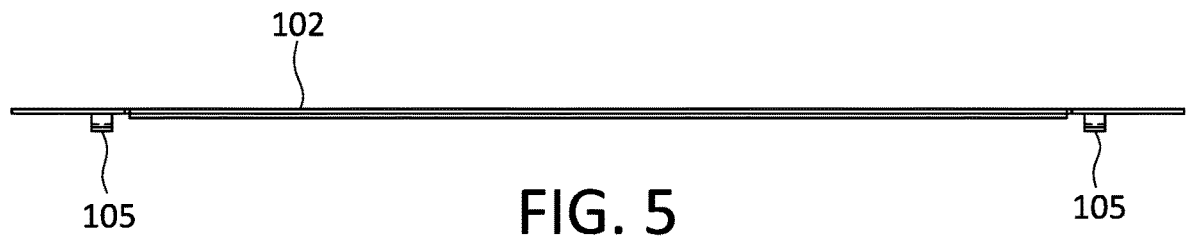
FIG. 5 is a side elevational view of the slat shown in FIG. 4.
Figure 6:
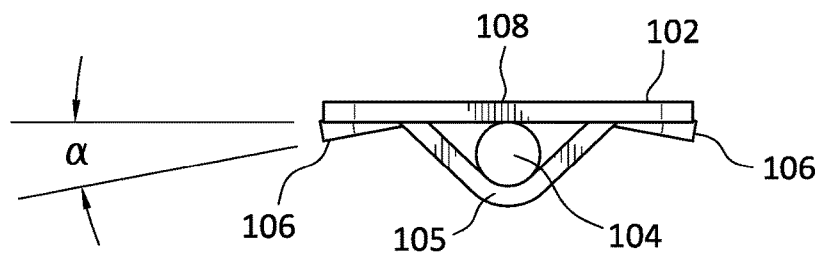
FIG. 6 is an enlarged cross-sectional view of the slat shown in FIG. 4 as taken along the line 6-6 of FIG. 4.

With reference now being made to FIGS. 4, 6, and 7, in order to effectively connect the plurality of slat members 102 together so as to collectively form the endless conveyor 100, as well as to drive the endless conveyor 100 formed by the plurality of slat members 102, each one of the slat members 102 is respectively fixedly secured, such as, for example, by means of a crimping process or a welding process, to one of a plurality of the longitudinal rods 104, which are disposed parallel to each other, such that the plurality of longitudinal slats 102 are effectively centered upon the longitudinal rods 104. The end sections 110 of each one of the plurality of rods extend longitudinally beyond the end portions of their respective slat members 102, as can best be appreciated from FIGS. 1 and 2, whereby each opposite end section of each one of the plurality of longitudinal rods 104 is then bent so as to form a 90° knuckle bend 112, or to which a 90° knuckle connector 112 can be attached to the end section 110 of each one of the plurality of longitudinal rods 104, whereby a second rod section 114 extends perpendicular to the first rod section 110 and thereby extends substantially parallel to the direction of movement D of the endless conveyor 100. Lastly, a 180° knuckle bend or connector 116 is attached to the second rod section 114 such that a third rod section 118 is effectively disposed within the same plane as that of the second rod section 114 and is likewise disposed substantially parallel to the direction of movement D of the endless conveyor 100. Furthermore, it is to be appreciated that the knuckle bend 116 of each rod connector assembly also partially surrounds the first rod section 110 of an adjacent one of the plurality of rods 104 fixedly connected to an adjacent one of the plurality of longitudinal slat members 102. In this manner, all of the longitudinal slat members 102 are fixedly secured to their respective rods 104, and all of the rods 104 are connected together as a result of each rod 104 being respectively connected to an adjacent one of the plurality of rods 104.

Still further, it has been noted that when the conveyor 100 has been in operation for a substantially long period of time, the conveyor chain, effectively formed by means of the plurality of rod connector assemblies comprising the rod connector components 110-118, will effectively elongate or stretch. Despite the fact that the conveyor assembly 100 may be provided with an automatic take-up system, not shown, which effectively adjusts the tension upon the conveyor chain, a point in time will be reached whereby the conveyor chain can no longer be adjusted. Therefore, in accordance with the principles and teachings of the present invention, an entire conveyor slat assembly, comprising a conveyor slat 102, its rod 104, and the rod connector components 110-118 can be removed whereby the two conveyor slat assemblies, disposed upon opposite sides of the conveyor slat assembly that has been removed, are now connected together through means of their respective rod connector components 110-118. Lastly, as can best be appreciated from FIG. 2, it is also to be noted that when the plurality of rods 104 are connected together as has been described, adjacent pairs of end portions, or first rod sections, 110 of the plurality of rods 104, together with the second intervening or connecting sections 114 of the plurality of rods 104 and the end portions of the slat members 102, effectively form four-sided spaces 120 within which sprockets of the conveyor drive mechanism are able to be accommodated so as to in fact be capable of driving the endless conveyor 100 along its endless conveyor path.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Conveyor
102—Longitudinal slats of conveyor 100
104—Longitudinal rods of conveyor 100 to which slats 102 are fixedly secured
105—Cutouts for accommodating the end portions of the rods 104
106—Downwardly angled leading and trailing edge portion of slats 102
108—Upper conveying surface of conveyor 100
110—End sections of rods 104
112—90° knuckle connecting end rod portions 110 and second sections 114
114—Second rod sections 110
116—180° knuckle connecting second sections 114 to third section 118
118—Third rod sections
120—Spaces defined between rod end portion 110 to accommodate sprockets
D—Direction of movement of conveyor 100
S—Normal spacing defined between adjacent slats 102
α—Angle at which the edge portions of the slats extend downwardly from the major planar portion of each slat

What is claimed as new and desired to be protected by Letters Patent, is:

1. An endless conveyor belt for conveying articles in a predetermined direction along a predetermined conveyor path, comprising:
   a plurality of slat members disposed parallel to each other, having predetermined length dimensions, and disposed transversely with respect to said predetermined direction along which said conveyor belt conveys articles along said predetermined conveyor path;
   wherein each one of said plurality of slat members has a main planar surface such that, collectively, said plurality of slat members define a conveying surface upon which articles being conveyed are supported;
   wherein each one of said plurality of slat members has a predetermined width dimension extending in said predetermined direction along which said conveyor belt conveys articles along said predetermined conveyor path; and
   wherein free leading and trailing edge portions of each one of said plurality of slat members are angled downwardly at an acute angle with respect to said main planar surface of each one of said plurality of slat members upon which articles being conveyed are supported so as to prevent edge portions of the articles being conveyed from being interposed between said leading and trailing edge portions of said slat members so as not to be pinched by adjacent ones of said leading and trailing edge portions of adjacent ones of said plurality of slat members.

2. The conveyor belt as set forth in claim 1, wherein:
   said leading and trailing edge portions of each one of said plurality of slat members are angled downwardly, with respect to said conveying surface upon which articles being conveyed, at a predetermined angle.

3. The conveyor belt as set forth in claim 2, wherein:
   said predetermined angle is 10°.

4. The conveyor belt as set forth in claim 1, wherein:
   said plurality of slat members are fabricated from T304 stainless steel.

5. The conveyor belt as set forth in claim 1, wherein:
   said plurality of slat members are fabricated so as to have a No. 2B brush finish so as to provide a proper conveying surface for the articles to be conveyed along said conveyor path by said conveyor.

6. The conveyor belt as set forth in claim 5, wherein:
   said brush finish of each slat member is accomplished by using a 20 grit belt with each slat member being passed through a finishing process twice.

7. The conveyor belt as set forth in claim 1, wherein:
   said conveyor belt comprises an endless conveyor belt.

8. An endless conveyor belt for conveying articles in a predetermined direction along a predetermined conveyor path, comprising:
   a plurality of slat members disposed parallel to each other, having predetermined lengths, and disposed transversely with respect to said predetermined direction along which said conveyor belt conveys articles along said predetermined conveyor path;
   wherein each one of said plurality of slat members has a main planar surface such that, collectively, said plurality of slat members define a conveying surface upon which articles being conveyed are supported;

wherein each one of said plurality of slat members has a predetermined width extending in said predetermined direction along which said conveyor belt conveys articles along said predetermined conveyor path; and a plurality of separate rod members respectively fixedly secured to a central underlying surface portion of each one of said plurality of slat members forming an upper run portion of said endless conveyor and having end portions extending beyond said predetermined lengths of each one of said plurality of slat members.

9. The conveyor belt as set forth in claim 8, wherein:

said plurality of slat members are respectively fixedly secured to said plurality of separate rod members by a welding process.

10. The conveyor belt as set forth in claim 8, wherein:

said plurality of slat members have predetermined longitudinal extents;

said plurality of separate rod members have predetermined longitudinal extents which are greater than said predetermined longitudinal extents of said slat members; and said plurality of slat members are respectively fixedly secured in a centralized manner upon said plurality of separate rod members whereby end portions of said plurality of separate rod members extend longitudinally beyond end portions of said plurality of slat members.

11. The conveyor belt as set forth in claim 10, wherein:

said end portions of said plurality of rod members are connected together.

12. The conveyor belt as set forth in claim 11, wherein:

an end portion of a first rod member fixedly secured to a first slat member is connected to second and third rod members respectively secured to second and third slat members which are disposed upon opposite sides of said first slat member.

13. The conveyor belt as set forth in claim 12, wherein:

each one of said end portions of said rod members comprises first, second, and third sections, a first knuckle connector integrally connecting said first section to said second section, and a second knuckle connector integrally connecting said second section to said third section.

14. The conveyor belt as set forth in claim 13, wherein:

said first knuckle connector of said first rod member is operatively connected to said second knuckle connector of said second rod member while said second knuckle connector of said first rod member is operatively connected to said first knuckle connector of said third rod member.

15. The conveyor belt as set forth in claim 13, wherein:

said first, second, and third sections of said rod members, and said first and second knuckle connectors of said rod members together define open spaces for accommodating drive and driven sprockets of a conveyor mechanism for driving said conveyor belt along said conveyor path.

16. The conveyor belt as set forth in claim 13, wherein:

each one of said plurality of slat members, including its rod member, said first, second, and third sections of said rod members, and said first and second knuckle connectors of said rod members, are removable from said conveyor belt such that slat members, disposed upon opposite sides of said slat member that has been removed from said conveyor belt, can be operatively connected together.

17. The conveyor belt as set forth in claim 8, wherein:

said plurality of slat members are respectively fixedly secured to said plurality of separate rod members by a crimping process.

* * * * *